No. 612,406. Patented Oct. 18, 1898.
J. H. DAVIS.
STEW PAN.
(Application filed Aug. 3, 1897.)
(No Model.)
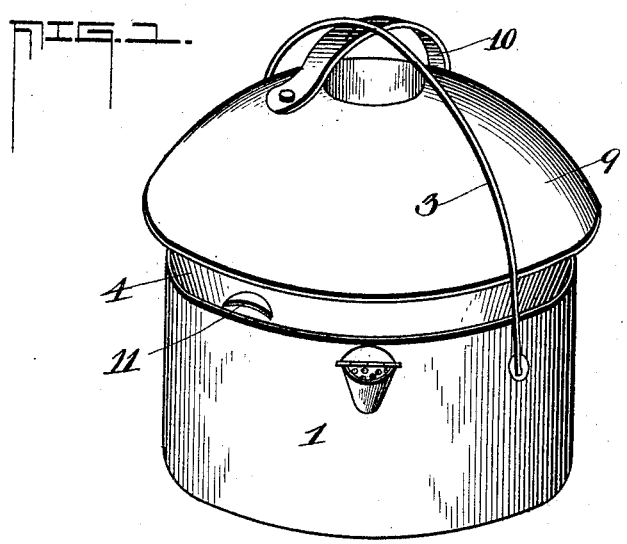
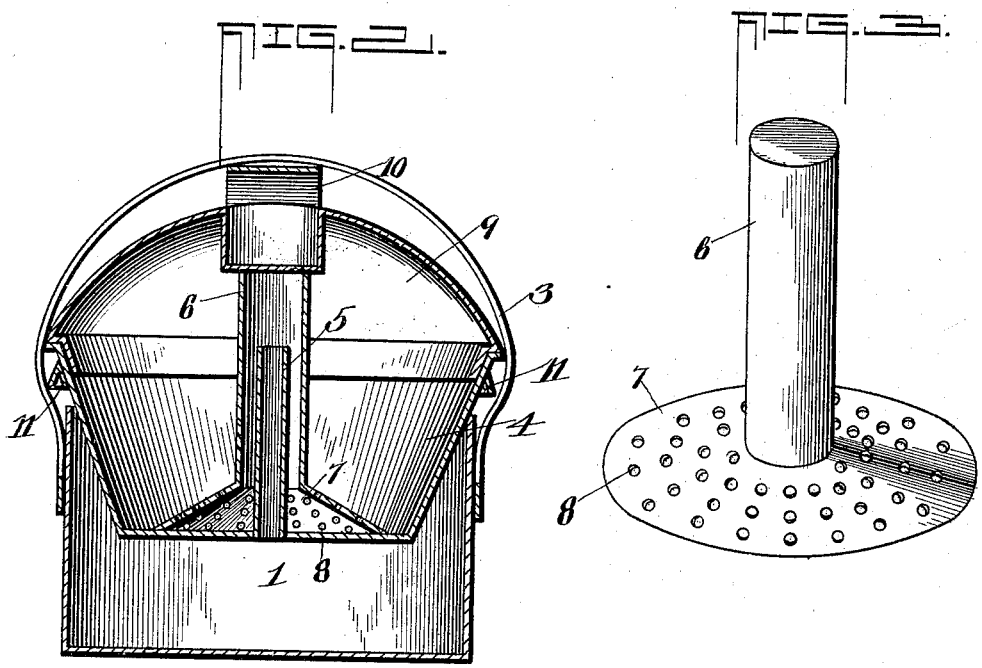
Witnesses
Geo. T. Byrne
Victor J. Evans
Inventor
Joseph Harvey Davis.
by John Wedderburn
Attorney

UNITED STATES PATENT OFFICE.

JOSEPH HARVEY DAVIS, OF LEXINGTON, KENTUCKY, ASSIGNOR OF ELEVEN-TWENTIETHS TO JAMES W. ZACHARY AND JAMES S. REED, OF SAME PLACE.

STEW-PAN.

SPECIFICATION forming part of Letters Patent No. 612,406, dated October 18, 1898.

Application filed August 3, 1897. Serial No. 646,917. (No model.)

*To all whom it may concern:*

Be it known that I, JOSEPH HARVEY DAVIS, of Lexington, in the county of Fayette and State of Kentucky, have invented certain new and useful Improvements in Stew-Pans; and I do hereby declare the following to be a full, clear, and exact description of the invention, such as will enable others skilled in the art to which it appertains to make and use the same.

This invention relates to stew-pans or analogous utensils; and it consists, essentially, of a water-containing receptacle having a steaming-receptable mounted therein provided with a removacle thimble with a lower flange wherein a series of openings are formed to cause the steam to rise up through the material being cooked.

The invention further consists of the details of construction and arrangement of the several parts, which will be more fully hereinafter described and claimed.

The object of the invention is to cause steam to pass through the food being cooked to facilitate the cooking process and retain a full flavor of the materials and also prevent the escape of odors incidental to cooking certain vegetables.

In the accompanying drawings, Figure 1 is a perspective view of a stew-pan or cooking utensil embodying the invention. Fig. 2 is a transverse vertical central section. Fig. 3 is a detail perspective view of a thimble used in connection with the utensil.

Referring to the drawings, wherein similar numerals of reference are employed to indicate corresponding parts in the several views, the numeral 1 designates a receptacle for containing water and having movably attached thereto a bail 3. Removably mounted in the upper portion of the said receptacle 1 is a stew or steaming pan 4, which is preferably flared and bears firmly against the upper edge of the receptacle 1 and may be secured thereto, if desired. Rising centrally from the bottom of said pan 4 is a tube 5, open at both ends, and thereover is removably mounted a thimble 6, having a flaring flange 7 at the base thereof to rest closely against the bottom of said pan 4. The said flange has also a series of openings 8 therein. The thimble 6 is held over the tube 5 in such manner as to permit the steam to pass upwardly through the tube and downwardly through the space between the thimble and the tube to the compartment formed by the flaring flange 7 and then outwardly through the food or material being cooked. The said flange has a conical contour, and the thimble carrying the flange can be easily removed from the tube 5 at any time desired for cleaning and other purposes.

As a convenient auxiliary to facilitate the proper operation of the utensil a cover 9 is placed on the upper edge of the pan 4 and is cupped or dished in such manner that at its central portion it will rest upon the upper end of the thimble 6. On the upper portion of the said cover a stiff handle 10 is located, and the bail 3, attached to the receptacle 1, is drawn upwardly over the said handle and begins to bind thereon before the center thereof is reached. As the said bail is brought over on the handle the pressure exerted increases and the edge of the cover is clamped securely against the edge of the pan, and the upper cupped or dished portion of said cover is also brought to bear firmly on the upper end of the thimble 6. By this means a thoroughly steam-tight arrangement may be obtained, and the food or material in the pan is thoroughly penetrated by the steam and the steam retained by the cover 9 to prevent the escape of essences from the food or material in the said pan. The pan 4 is supplied with small handles 11 to place the fingers in to lift it from the lower receptacle 1 when the devices are separably engaged. When the receptacle 1 and the pan 4 are united or fastened together, means will be provided for placing water in the said receptacle.

It will be understood that water will be placed in the receptacle 1 and that ebullition will ensue to form the steam which passes upwardly through the tube 5, as heretofore set forth.

The top of the thimble 6 is preferably removable, as shown, so that it can be more easily cleaned.

The parts of the device may be varied in proportions or dimensions, and it is obviously apparent that many minor changes in the details of construction and arrangement of the several parts might be made and substituted for those shown and described without in the least departing from the nature or spirit of the invention.

Having thus described the invention, what is claimed as new is—

In a device of the character set forth, the combination of a receptacle for holding water, a pan mounted in the upper portion thereof having a central tube, a thimble removably mounted over the said tube and provided with a lower flaring flange with openings therein, a cover removably mounted in said pan and adapted to engage the upper end of the thimble, said cover being provided with a handle, and a bail attached to the receptacle and adapted to engage the said handle of the cover to hold the parts firmly closed, substantially as described.

In testimony whereof I have signed this specification in the presence of two subscribing witnesses.

JOSEPH HARVEY DAVIS.

Witnesses:
W. N. CROPPER,
M. H. H. DAVIS.